(12) United States Patent
Ellis

(10) Patent No.: US 11,877,550 B1
(45) Date of Patent: Jan. 23, 2024

(54) PORTABLE BALE BREAKER AND POTTING APPARATUS

(71) Applicant: Mitchell Ellis Products, Inc., Wilmer, AL (US)

(72) Inventor: Carlos Mitchell Ellis, Wilmer, AL (US)

(73) Assignee: Mitchell Ellis Products, Inc., Wilmer, AL (US)

( * ) Notice: Subject to any disclaimer, the term of this patent is extended or adjusted under 35 U.S.C. 154(b) by 379 days.

(21) Appl. No.: 17/465,013

(22) Filed: Sep. 2, 2021

(51) Int. Cl.
*A01G 9/08* (2006.01)
*A01B 35/32* (2006.01)
*A01B 35/30* (2006.01)
*A01B 35/28* (2006.01)

(52) U.S. Cl.
CPC .............. *A01G 9/081* (2013.01); *A01B 35/28* (2013.01); *A01B 35/30* (2013.01); *A01B 35/32* (2013.01)

(58) Field of Classification Search
CPC .......... A01G 9/081; A01G 9/08; A01B 35/32; A01B 35/28; B02C 19/0012; A01F 29/005
See application file for complete search history.

(56) References Cited

U.S. PATENT DOCUMENTS

| | | | |
|---|---|---|---|
| 2,826,003 A * | 3/1958 | Oki | A01G 9/081 47/1.01 R |
| 3,012,370 A * | 12/1961 | Lortz | A01G 9/081 47/1.01 R |
| 3,782,033 A * | 1/1974 | Hickerson | A01G 9/081 47/1.01 R |
| 4,363,341 A | 12/1982 | Powell | |
| 5,284,190 A * | 2/1994 | Jones | A01C 11/00 47/1.01 R |
| 5,573,190 A * | 11/1996 | Goossen | A01F 29/005 241/27 |
| 5,641,008 A | 6/1997 | Ellis | |
| 5,839,674 A * | 11/1998 | Ellis | B02C 19/005 241/73 |
| 6,227,468 B1 * | 5/2001 | De Baat | A01F 29/005 241/200 |
| 8,590,583 B2 | 11/2013 | Ellis | |
| 9,730,396 B2 | 8/2017 | Lando et al. | |
| 2006/0090813 A1 * | 5/2006 | Van Der Burg | A01G 9/081 141/125 |
| 2016/0207049 A1 * | 7/2016 | Ellis | B02C 18/18 |
| 2021/0007290 A1 * | 1/2021 | Ellis | A01G 9/083 |
| 2023/0276744 A1 * | 9/2023 | Tavakoli | A01G 9/083 47/1.01 R |

* cited by examiner

*Primary Examiner* — Timothy P. Kelly
(74) *Attorney, Agent, or Firm* — AdamsIP, LLC; Stephen Thompson; J. Hunter Adams

(57) ABSTRACT

A portable bale breaker and potting apparatus is provided. Soil bales or blocks may be loaded onto an inclined bed and conveyed to rotating breaker bars that break the soil apart into loose soil. The loose soil is conveyed by an auger into a chute which deposits the loose soil into pots on a conveyor belt positioned below the chute. Rotating brush heads downstream of the chute remove excess soil from each pot. The apparatus includes a soil management system for recycling loose overflow soil back to an upstream position on the bed.

21 Claims, 12 Drawing Sheets

PORTABLE BALE BREAKER AND POTTING APPARATUS

FIELD OF THE DISCLOSURE

The present disclosure relates generally to an apparatus to assist in plant potting operations. More specifically, embodiments of the present disclosure relate to a portable apparatus for breaking apart bales of soil and filling pots with the soil.

BACKGROUND

Horticultural growers often grow and sell a variety of different types of plants and have a need to periodically place growing plants (e.g., seedlings, shrubs, flowers, trees, and the like) in pots of sufficient size to accommodate future growth or to otherwise prepare such plants for sale. The first step of potting plants is typically to fill pots with soil. A drill may then be used to form a hole in the soil for planting by lowering and then lifting a drill bit into and out of the soil to remove a portion of the soil from the pot. A variety of machines designed to assist horticultural growers in filling large numbers of pots with soil for potting plants are known within the art. However, such machines that are suitable for commercial grower operations are typically very large, bulky machines that occupy a large area of space. In addition, such machines are generally designed to handle loose soil for filling pots. In some commercial operations, soil may be provided in the form of large blocks or bales that are not loose and thus cannot generally be handled well by such pot filling machines.

Accordingly, a need exists for improved apparatuses and methods that address the above-described disadvantages.

SUMMARY

In one aspect, a potting apparatus for filling pots with soil and a method of using the apparatus are provided. The apparatus may be installed on a portable trailer having wheels and a tow hitch so that the apparatus may be moved between sites for use. The apparatus preferably includes a generator installed on the trailer for remote power. The apparatus comprises a bed and a first conveyor configured to convey soil along the bed in a first conveyance direction from an upstream end of the bed to a downstream end of the bed. Large blocks or bales of soil may be loaded onto the bed at the upstream end and conveyed downstream to a pair of opposing rotating breaker bars positioned over the bed. The breaker bars break apart the soil blocks to form loose, free flowing soil. The loose soil is conveyed past the breaker bars to the downstream end of the bed, at which point the soil falls into a trough positioned below the downstream end of the bed. An auger is positioned within the trough and is configured to convey the loose soil into a chute.

The apparatus further comprises a second conveyor positioned below the chute. The second conveyor comprises a belt configured to convey planting pots received on an upper surface of the belt in a second conveyance direction. A plurality of pots can be fed continuously onto the conveyor belt so that the pots pass under the chute as the first conveyor and auger continuously direct loose soil downward through the chute and into the pots, thereby continuously filling the pots as they pass beneath the chute. In a preferred embodiment, the apparatus further comprises a soil removal element, which preferably comprises a plurality of rotating brush heads. The brush heads are positioned over the second conveyor at a downstream position from the chute so that each of the pots passes below the brush heads. As the brush heads rotate, they remove excess soil from an upper end of each soil-filled pot as the soil-filled pot is conveyed on the belt. The apparatus preferably includes an enclosure comprising two opposing walls positioned along opposite sides of the bed. The second conveyor has two opposing ends, and each end is adjacent to an opening in each wall on each side of the apparatus. Thus, empty pots may be fed into one side of the apparatus, and soil-filled pots are then delivered to the opposite side of the apparatus. Because the apparatus is preferably installed on a trailer for ease of transport, the width of the device is preferably small enough so that the device may be transported on a standard roadway. The direction of conveyance of the second conveyor may be reversed so that pots may be fed into either side of the apparatus, which may be advantageous when using the apparatus within small enclosed spaces, such as a greenhouse. The trailer may be maneuvered into a convenient position at a site for use, and then pots may be fed into the device from whichever side is more convenient to the user. The position of the brush heads may be adjusted to either side of the chute so that the brush heads may be positioned downstream of the chute regardless of which direction the second conveyor is set to move.

The apparatus preferably includes a lift at the upstream end of the bed for lifting blocks of soil onto the bed for conveying the soil to the breaker bars. The lift comprises a platform operatively connected to hydraulic arms and pivotally mounted onto the apparatus at the upstream end of the bed, which is generally at the rear end of the apparatus. The lift preferably includes a retaining element configured to retain a pallet on the platform. Thus, a pallet of soil may be loaded onto the platform, and the hydraulic arms can be activated to pivot the platform upward so that the soil falls from the platform onto the bed where the first conveyor then conveys the soil to the breaker bars for breaking the soil apart. The retaining element prevents the pallet from falling onto the bed. The platform may then be lowered back down so that the empty pallet can be removed and a new pallet loaded onto the platform.

The apparatus may also include a soil management system for recycling loose overflow soil back to the upstream end of the bed so that the soil is redistributed back to a pot for filling. In a preferred embodiment, the first conveyor comprises a plurality of bars in spaced relation to each other and two opposing drive chains. The bed is in a fixed position, and each of the spaced bars is in a position abutting the fixed surface of the bed. Each of the spaced bars is attached at one end to one of the drive chains and at an opposite end to the opposing drive chain. Each drive chain is positioned along one respective side of the bed, and the drive chains are configured to move the spaced bars along the fixed surface of the bed to convey the soil from the upstream end of the bed to the downstream end of the bed. The apparatus includes a floor disposed below the bed and below the second conveyor. A plurality of sprockets are configured to drive the drive chains in a loop from the upstream end of the bed to the downstream end of the bed and back to the upstream end. A portion of the loop is positioned relative to the floor so as to cause the spaced bars to move along the upper surface of the floor with the spaced bars abutting the surface of the floor, which thereby conveys any overflow soil that falls off of the second conveyor down onto the floor back to the upstream end of the bed for recycling the soil back to a pot to be filled. A second auger is preferably disposed below the second conveyor and is configured to convey overflow soil that falls off the ends or the sides of the second conveyor onto the floor for recycling.

Further embodiments and features, as well as the structure and operation of various embodiments are described in detail below with reference to the accompanying drawings. It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. References to "one embodiment", "an embodiment", "some embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "comprises" and "includes", and grammatical equivalents thereof are open-ended and are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
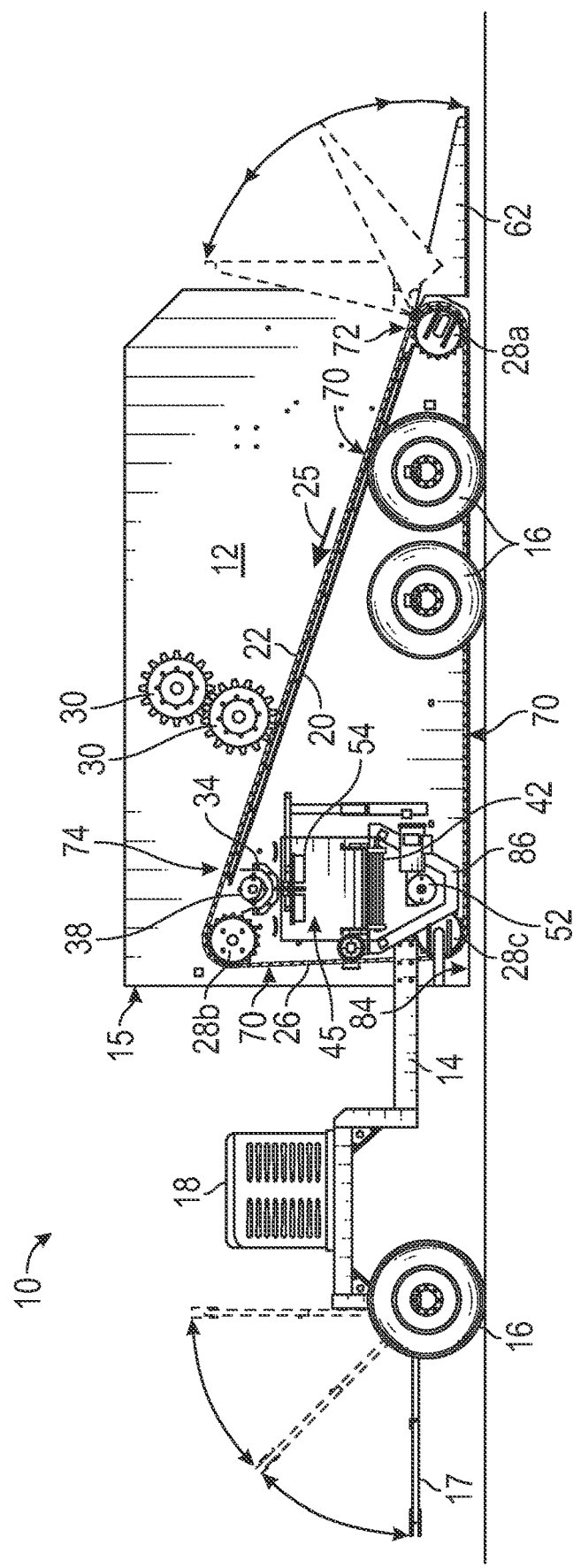
FIG. 1 is a left side, partially transparent schematic view of a portable potting apparatus in accordance with the present disclosure.
Figure 2:
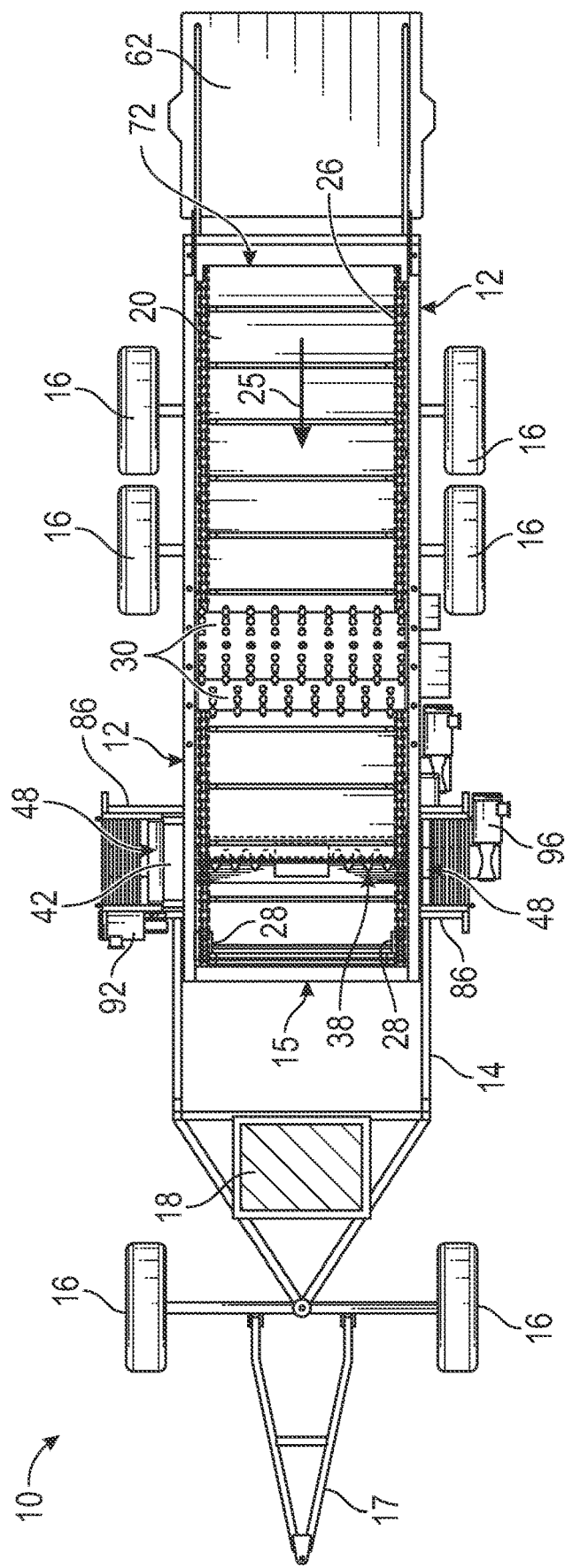
FIG. 2 is a top plan view of a portable potting apparatus in accordance with the present disclosure.
Figure 3:
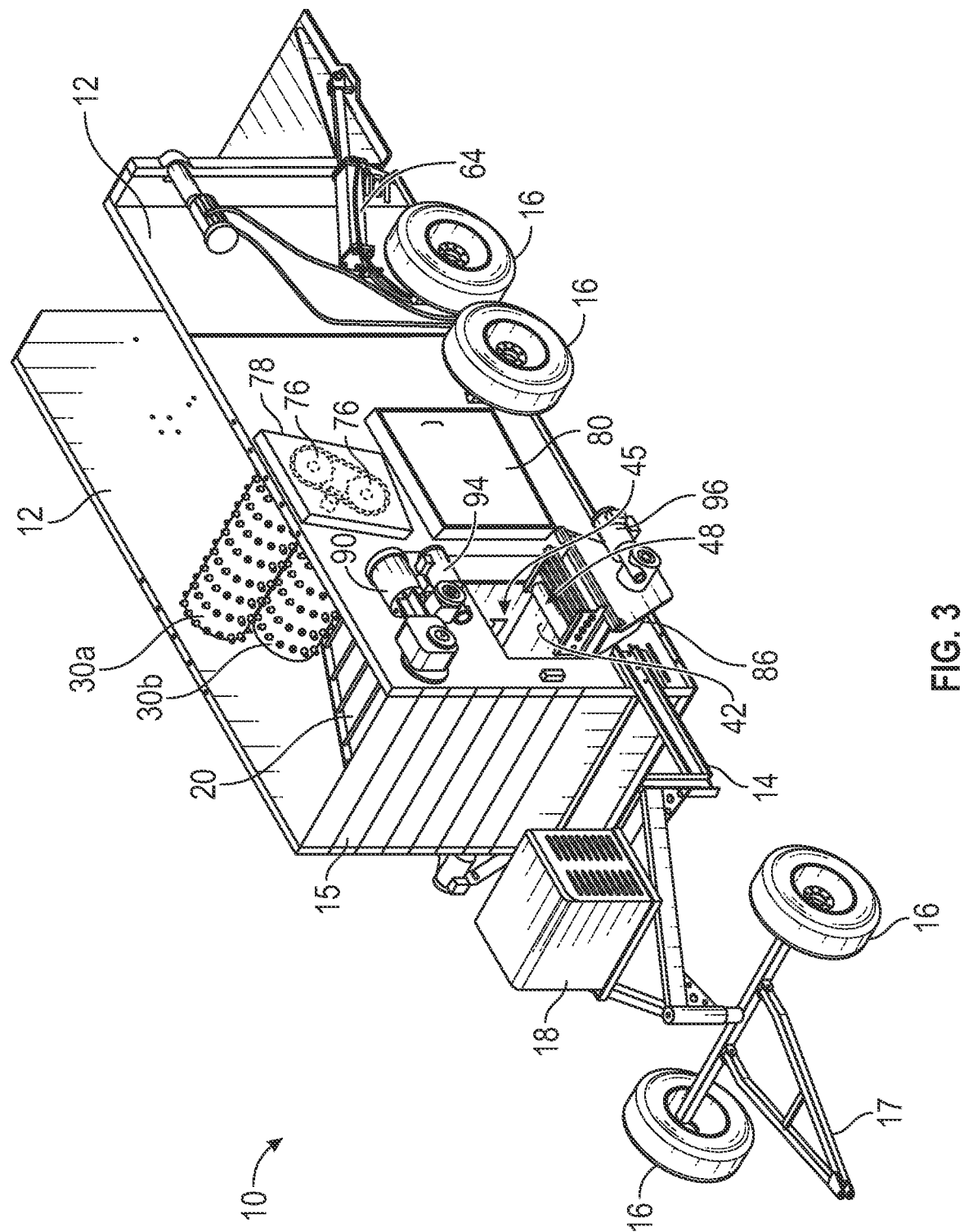
FIG. 3 is a left side perspective view of a portable potting apparatus in accordance with the present disclosure.
Figure 4:
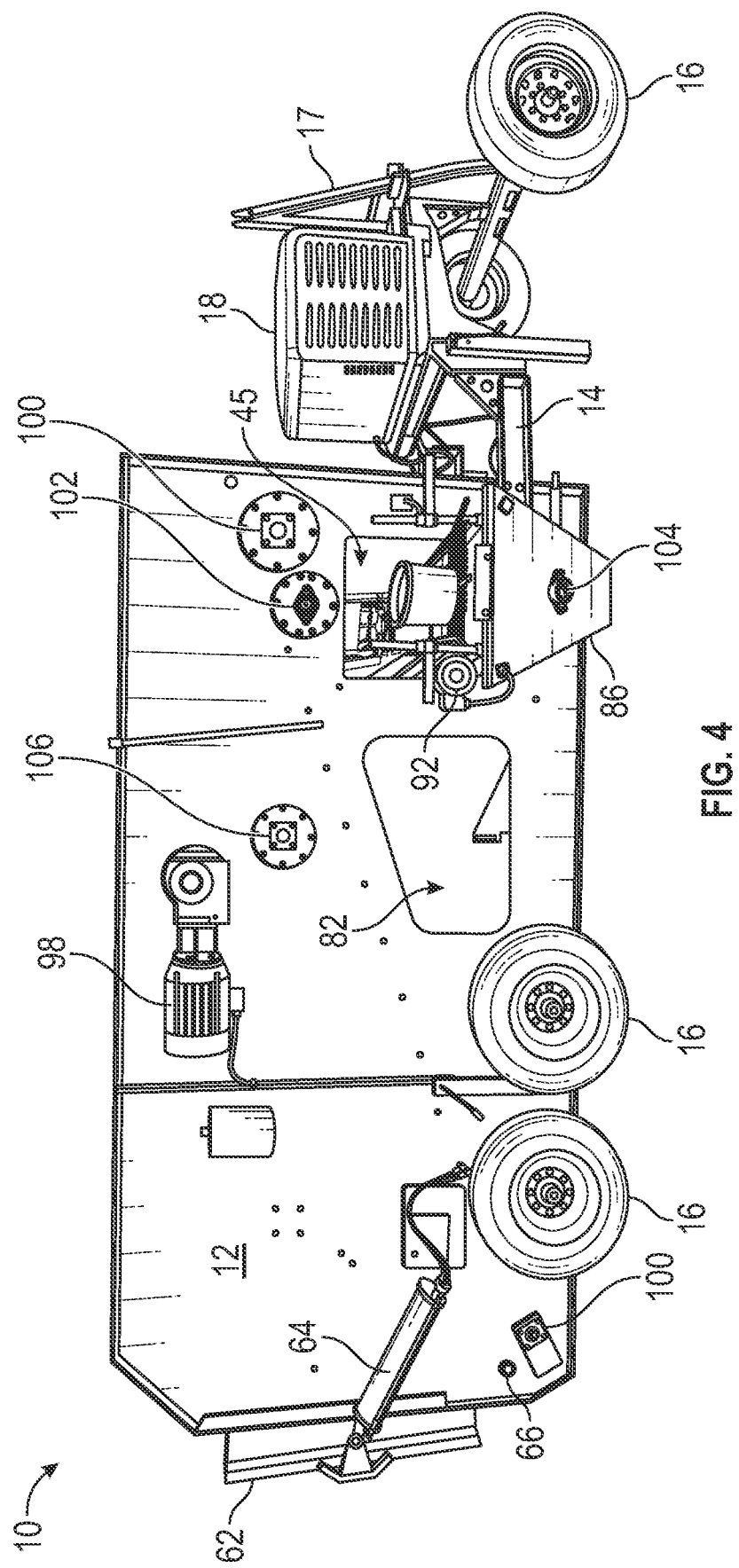
FIG. 4 is a right side view of a portable potting apparatus in accordance with the present disclosure.
Figure 5:
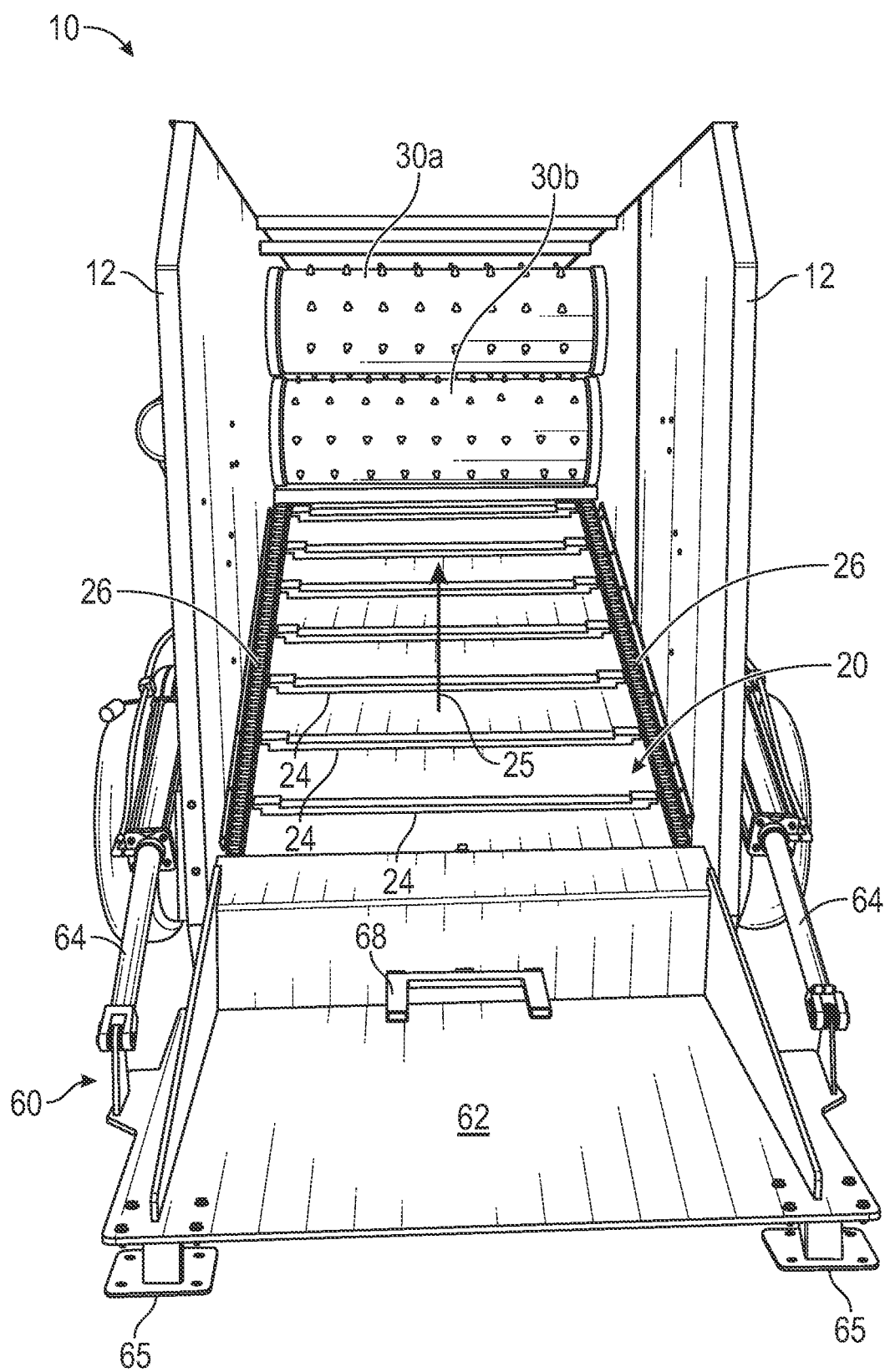
FIG. 5 is a rear view of a portable potting apparatus in accordance with the present disclosure.

Turning to the drawings, FIGS. 1-12 show various embodiments of a potting apparatus 10, or components thereof, which may be utilized to fill pots 88 with soil. As best seen in FIGS. 1-4, the apparatus 10 is preferably installed on a portable trailer 14 having wheels 16 and a tow hitch 17 so that the apparatus 10 may be moved between sites for use in different locations. The tow hitch 17 may optionally be pivoted upwardly to minimize the footprint of the apparatus 10 when unhitched. The apparatus 10 preferably includes a generator 18 installed on the trailer 14 for remote power, which is preferably installed toward a front end of the trailer 14 behind the tow hitch 17, as best seen in FIG. 1. In a preferred embodiment, the generator 18 may be powered by propane gas from a propane tank. The apparatus 10 preferably includes an enclosure comprising two opposing side walls 12 on either side of the trailer 14 and preferably a front wall 15 on the front end nearer to the tow hitch 17. As shown in FIG. 4, one of the walls 12 may have a large opening 82 in order to provide access to the interior of the apparatus 10 for maintenance work. As shown in FIG. 2, the top side of the apparatus is preferably open. The width of the apparatus 10 is preferably small enough so that the apparatus 10 may be towed by a vehicle on a standard roadway, thereby making the apparatus easily portable to various sites for use. In addition, as best seen in FIGS. 1 and 5, the rear end opposite the tow hitch 17 preferably has a lift platform 62 for loading blocks of soil from pallets into the apparatus 10 for processing the soil and filling pots. Thus, soil may be loaded into a rear end of the apparatus 10, and pots 88 may be fed onto a conveyor belt 44 on one side of the apparatus 10 and continuously filled with soil. The conveyor belt 44 then delivers soil-filled pots to the opposite side of the apparatus 10. The direction of conveyance of the conveyor belt 44 may be reversed so that pots 88 may be fed into either side of the apparatus 10 so that the apparatus is easily adaptable to different work sites having different equipment configurations.

The apparatus 10 comprises a bed 20 and a first conveyor 22 configured to convey soil along the bed 20 in a first conveyance direction 25 from an upstream end 72 of the bed 20 to a downstream end 74 of the bed 20. The bed 20 comprises a generally flat surface, which is preferably inclined upwardly from the upstream end 72 to the downstream end 74, as best seen in FIG. 1. The opposing walls 12 are each positioned along one respective side of the bed 20 and generally parallel to the first conveyance direction 25.

Figure 7:
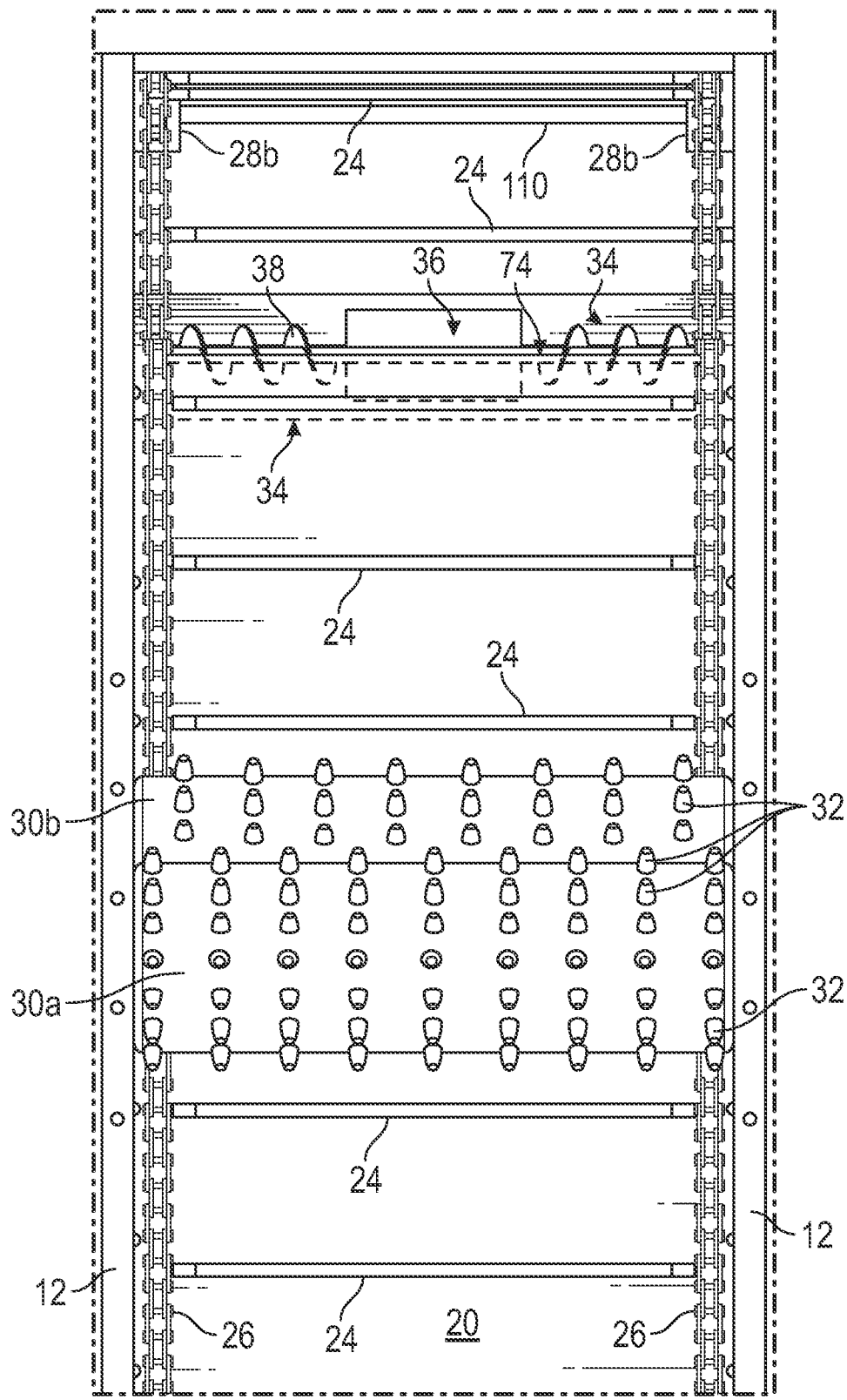
FIG. 7 is a partial top view of a portable potting apparatus showing an auger for conveying soil in accordance with the present disclosure.

Large blocks or bales of soil may be loaded onto the bed 20 at the upstream end 72 and conveyed downstream to a pair of opposing rotating breaker bars 30 positioned over the bed 20. The breaker bars 30 are positioned transverse to the first conveyance direction 25 and preferably perpendicular to the first conveyance direction 25. The breaker bars 30 are configured to break apart blocks of soil as the blocks are conveyed on the bed 20 in the first conveyance direction 25. The breaker bars 30 break apart the soil blocks to form loose, free flowing soil. The first conveyor 22 is configured to convey either blocks of soil (upstream of the breaker bars 30) or loose soil (downstream of the breaker bars 30). The breaker bars 30 preferably have a cylindrical shape. To facilitate breaking the soil apart, the breaker bars 30 preferably have teeth 32 disposed radially around an exterior surface of each of the bars 30. The bars 30 are preferably configured to rotate in the same direction, which is a clockwise direction from the point of view shown in FIG. 1. As best seen in FIG. 5, the two opposing breaker bars 30 preferably include a lower breaker bar 30b positioned in close proximity to the bed 20 and an upper breaker bar 30a positioned above the lower breaker bar 30b with some clearance for the teeth 32 of the bars 30 to pass in close proximity to each other. As best seen in FIG. 7, the teeth 32 may be positioned in rows that are offset from each other between the two breaker bars 30a and 30b to allow the bars 30 to be placed close together and rotate without the teeth 32 contacting each other in order to facilitate breaking apart the soil.

Both the upper and lower breaker bars 30a and 30b preferably rotate in a downward rotational direction toward the upstream end 72 of the bed 20 so that the teeth 32 engage downwardly with blocks of soil being conveyed from the upstream end 72 of the bed 20. Because the bed 20 is inclined, the upper breaker bar 30a is preferably positioned forward of the lower breaker bar 30b toward the upstream end 72 of the bed 20 so that the teeth 32 of the upper breaker bar 30a will engage a block of soil at the same time or before the lower breaker bar 30b. The upper breaker bar 30a may engage larger blocks of soil initially and begin breaking the soil apart while forcing the soil downward toward the lower breaker bar 30b. The rotation of the teeth 32 of the bars 30 causes the teeth 32 to engage with the soil to break the soil apart, while the close proximity of the bars 30 to each other and to the bed 20 results in free flowing soil on the bed 20 downstream of the rotating bars 30. Both breaker bars 30 may be powered by a single motor 98, which may be mounted onto an exterior of one of the walls 12, as shown in FIG. 4. To drive both bars 30 with a single motor 98, the bars 30 may have sprockets 76 attached to each breaker bar 30 at one end of the bar 30 and a drive chain connecting the two sprockets 76, as shown in FIG. 3. The sprockets 76 are preferably disposed on the exterior of one of the walls 12 of the apparatus 10 on the opposite side of the drive motor 98. Each breaker bar 30 may be mounted at each end onto one respective wall 12 on a bearing 106 to support the rotating bars 30, and each sprocket 76 rotates as the breaker bar 30 to which it is attached rotates. The apparatus may also include an adjuster sprocket configured for tensioning the drive chain connecting the two sprockets 76. The apparatus 10 may include a cover 78 for the sprockets 76 and drive chain so that moving parts on the exterior of the apparatus 10 are not exposed. In an alternative embodiment, the breaker bars 30 may rotate in opposite directions, in which case the breaker bars 30 may have intermeshing sprockets attached to each bar 30 (without a drive chain) so that the motor 98 drives one breaker bar 30, which then drives the opposing bar 30 in the opposite rotational direction via the intermeshing sprockets.

The apparatus 10 preferably includes a lift 60 at the upstream end 72 of the bed 20 for lifting large blocks of soil onto the bed 20 for conveying the soil to the breaker bars 30. The lift comprises a platform 62 operatively connected to a pair of hydraulic arms 64 attached to the exterior of the walls 12 of the apparatus, as best seen in FIG. 5. The hydraulic arms 64 are configured to pivot the platform 62 upward and downward, as indicated by the arrows shown in FIG. 1. An end of the platform 62 is pivotally mounted on an axle 66 positioned transverse to the first conveyance direction 25 at the upstream end 72 of the bed 20. The hydraulic arms 64 are configured to pivot the platform 62 about an axis of rotation of the axle 66, which may be mounted onto the walls 12 with bearings at opposing ends of the axle 66. The lift 60 preferably includes a retaining element 68 attached to the platform 62 and configured to retain a pallet on the platform 62 when the platform 62 is pivoted upward. As shown in FIG. 5, the retaining element 68 may comprise two elements spaced apart from each other that extend out over the platform 62 so that the two spaced elements fit into a standard pallet loaded onto the platform 62. Thus, a pallet of soil may be loaded onto the platform 62 using a forklift with the retaining element 68 inserted into a central opening of the pallet, and the hydraulic arms 64 can be activated to pivot the platform 62 upward so that the soil on the pallet falls off the pallet and onto the bed 20. The first conveyor 22 then conveys the blocks of soil along the bed 20 to the breaker bars 30 for breaking the soil apart. The retaining element 68 prevents the pallet from falling onto the bed 20 and conveyor 22. The platform 62 may then be lowered back down so that the empty pallet can be removed and a new pallet loaded onto the platform 62. As shown in FIG. 5, the platform 62 may include supports 65 at an end of the platform 62 opposite the bed 20 to support the platform 62 and to help keep the platform 62 in a level position when the platform 62 is lowered.

To effectively convey both blocks of soil and loose soil along the flat inclined surface of the bed 20, the first conveyor 22 preferably comprises a plurality of bars 24 in spaced relation and two opposing drive chains 26, as best seen in FIGS. 2, 5, and 7. The bed 20 is in a fixed position and does not move. Each of the spaced bars 24 is in a position abutting the fixed surface of the bed 20 and is positioned transverse to the first conveyance direction 25, and preferably perpendicular to the first conveyance direction 25. Each of the spaced bars 24 is attached at one end to one of the drive chains 26 and at an opposite end to the opposing drive chain 26. Each drive chain 26 is positioned along one respective side of the bed 20 and parallel to the first conveyance direction 25. The drive chains 26 are configured to move the spaced bars 24 along the fixed upper surface of the bed 20 to convey soil from the upstream end 72 of the bed 20 to the downstream end 74 of the bed 20. Because the spaced bars 24 move along the upper surface of the bed 20, they can convey either large or small pieces of soil in a downstream direction. The bars 24 pass below the lower breaker bar 30b in close proximity to the teeth 32 of the lower breaker bar 30b. Motion of the bars 24 and the teeth 32 of the lower breaker bar 30b ensure that any soil that passes below the lower breaker bar 30b is broken apart into relatively small pieces as the lower breaker bar 30b rotates and the bars 24 of the first conveyor 22 move along the bed 20.

Figure 8:
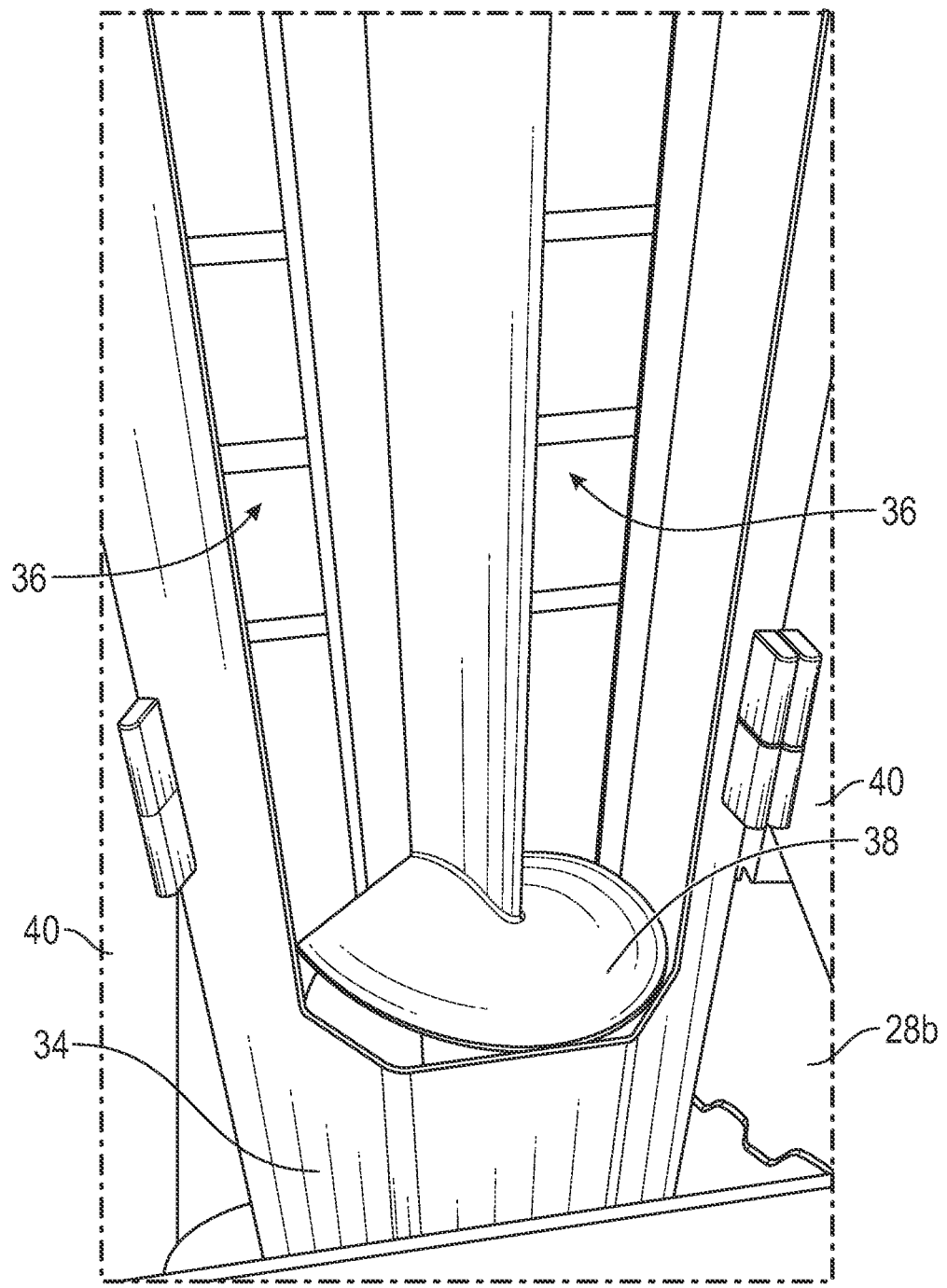
FIG. 8 is a partial bottom perspective view of the auger shown in FIG. 7 in accordance with the present disclosure.
Figure 11:
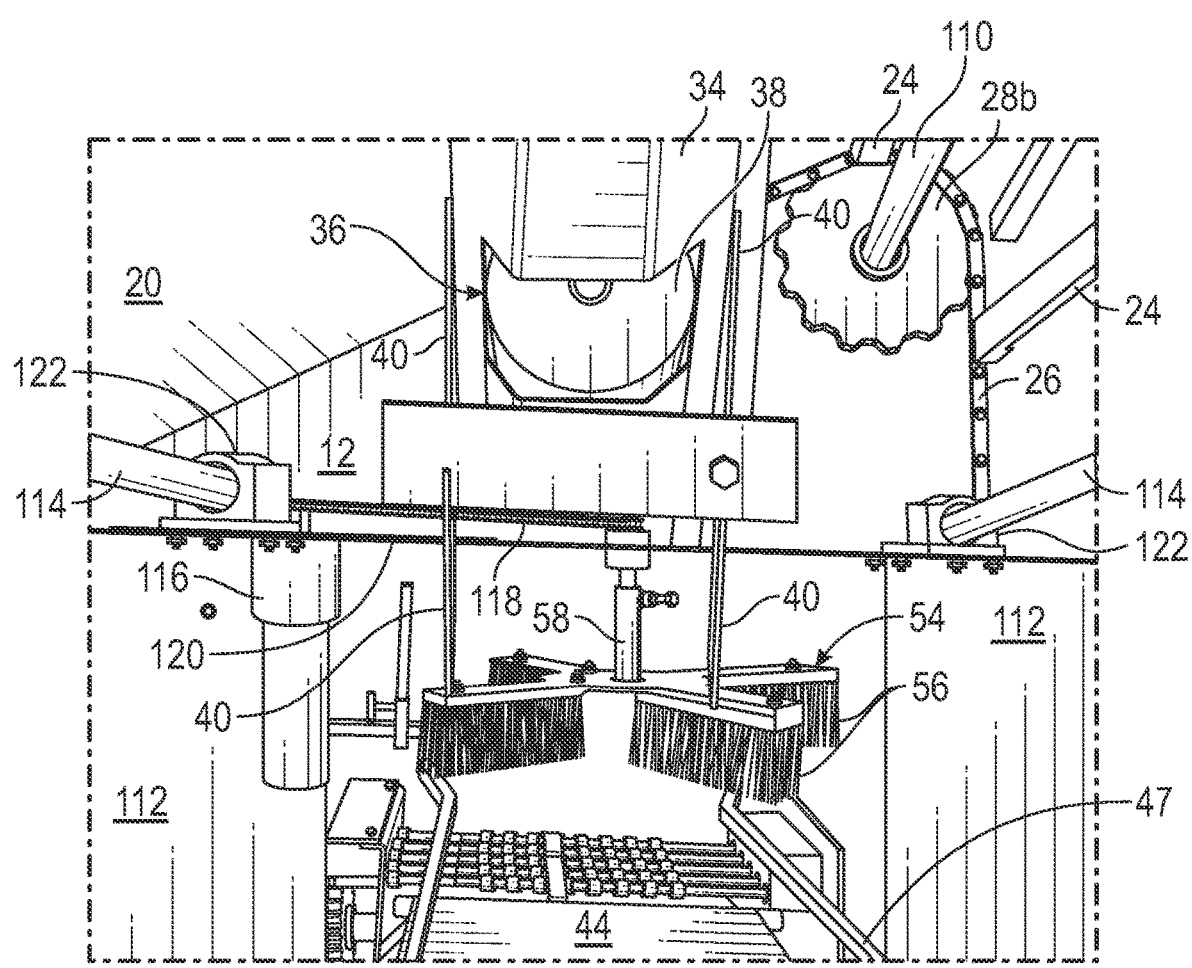
FIG. 11 is a partial perspective view of a chute and a rotating brush head positioned over the conveyor belt shown in FIG. 6 in accordance with the present disclosure.

The blocks of soil are conveyed along the bed 20 by the bars 24 of the first conveyor 22 toward the breaker bars 30. As the breaker bars 30 break the blocks of soil apart, the resulting loose soil is then conveyed past the breaker bars 30 to the downstream end 74 of the bed 20, at which point the soil falls off of the end 74 of the bed 20 and into a trough 34 positioned below the downstream end 74 of the bed 20, as best seen in FIGS. 1 and 7. The trough 34 is disposed transverse to the first conveyance direction 25 and preferably perpendicular to the first conveyance direction 25. The trough 34 generally extends between the two opposing walls 12. The trough 34 is elongated and preferably has a low point along a centerline of the trough 34 with upwardly extending longitudinal sides, as best seen in FIG. 1. An auger 38 is positioned within the trough 34 and is configured to convey the loose soil into a chute 36. In a preferred embodiment, the chute is defined by an opening 36 in the bottom of the trough 34 that is positioned generally at a center of the trough 34, as best seen in FIGS. 7 and 8, which show a top side and a bottom side of the trough 34, respectively. The chute 36 is preferably further defined by plates 40 that extend downward from the opening 36 to direct falling soil into pots 88 on the conveyor belt 44, as best seen in FIGS. 8 and 11. Thus, the opening 36 encompasses a longitudinal center point of the trough 34 at a low point of the trough 34. The auger 38 preferably has two opposing helical screw blades configured to convey soil from opposing ends of the auger 38 toward the chute 36. The auger 38 may be powered by a motor 94 mounted on the exterior of one of the walls 12 of the apparatus 10, as shown in FIG. 3. The opposing wall 12 of the apparatus 10 may have a mounted bearing 102 that supports the opposing end of the auger 38, as shown in FIG. 4.

Figure 6:
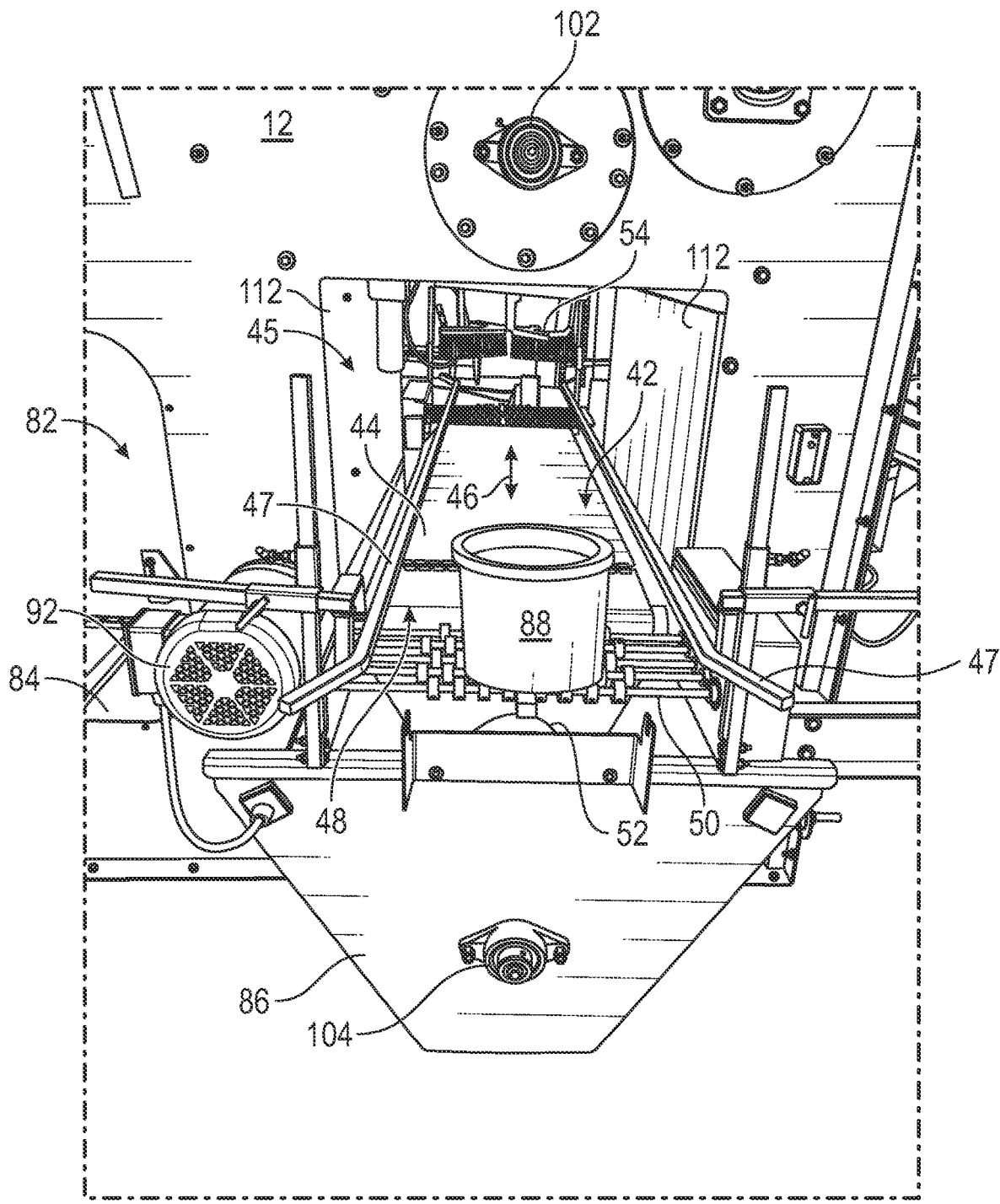
FIG. 6 is a partial side view of a portable potting apparatus showing a conveyor belt for conveying pots in accordance with the present disclosure.

The apparatus 10 further comprises a second conveyor 42 positioned below the chute 36, as best seen in FIGS. 1 and 6. The second conveyor 42 comprises a belt 44 configured to convey planting pots 88 received on an upper surface of the belt 44 in a second conveyance direction 46. As shown in FIGS. 2 and 4, the belt 44 is driven by a motor 92 that powers a drive pulley positioned at one end 48 of the belt 44 loop. A second idler pulley is positioned at an opposing end 48 of the belt 44. The motor 92 may be mounted on the exterior of the apparatus 10 and positioned so that the drive shaft of the motor 92 directly drives the drive pulley. The belt 44 preferably has a generally flat upper surface and does not include pot-receiving fixtures on the belt. The second conveyance direction 46 is transverse to the first conveyance direction 25, and preferably perpendicular to the first conveyance direction 25. A plurality of pots 88 can be fed continuously onto the conveyor belt 44 so that the pots pass under the chute 36 as the first conveyor 22 and auger 38 continuously direct loose soil downward through the chute 36 and into the pots 88, thereby continuously filling the pots with soil. FIG. 6 illustrates only a single pot 88 being fed onto the conveyor belt 44, though a steady, continuous stream of pots 88 is preferably fed onto the belt 44 during normal continuous operation of the apparatus 10. The pots 88 may be lined up on the belt 44 so that they are touching each other or in very close proximity to each other to minimize overflow of loose soil as the first conveyor 22 and auger 38 continuously convey soil downward to the conveyor belt 44 and pots 88 thereon.

The second conveyor 42 has two opposing ends 48, and each end 48 is positioned adjacent to an opening 45 in each wall 12 on each side of the apparatus 10, as best seen in FIGS. 3 and 4, which show opposite sides of the apparatus 10. Thus, empty pots 88 may be fed into one side of the apparatus 10, and soil-filled pots are then delivered to the opposite side of the apparatus 10. The direction of conveyance 46 of the second conveyor 42 may be reversed, as indicated by the arrows shown in FIGS. 6 and 10, so that pots 88 may be fed into either side of the apparatus 10 for filling and delivery to the opposite side, which may be advantageous by giving an operator of the apparatus 10 flexibility in the direction of the input and output of pots 88. The trailer 14 may be maneuvered into a convenient position at a site for use, and then pots 88 may be fed into the apparatus 10 from whichever side is more convenient to the operator. Pots 88 may then be fed continuously onto the conveyor belt 44. The conveyor belt 44 may be programmed to run continuously at a set speed or to pause briefly while a pot 88 is directly under the chute 36 and being filled with soil. The second conveyor 42 may include guide rails 47 to ensure that pots 88 stay on the belt 44. The apparatus 10 preferably also includes opposing internal walls 112 positioned along the conveyor belt 44 on opposite sides of the belt 44 to ensure that pots 88 cannot fall off the belt 44 into other interior portions of the apparatus 10, as best seen in FIGS. 6 and 11.

The apparatus may optionally include a drill installed over one or both ends 48 of the belt 44 to drill a hole in the soil of each soil-filled pot for planting a plant in the drilled hole. The drill may move only up or down to drill holes, or may optionally pivot over the belt 44 to drill a hole and then pivot away from the belt 44. The drill may be mounted on an exterior of a side wall 12 of the apparatus 10.

Figure 12:
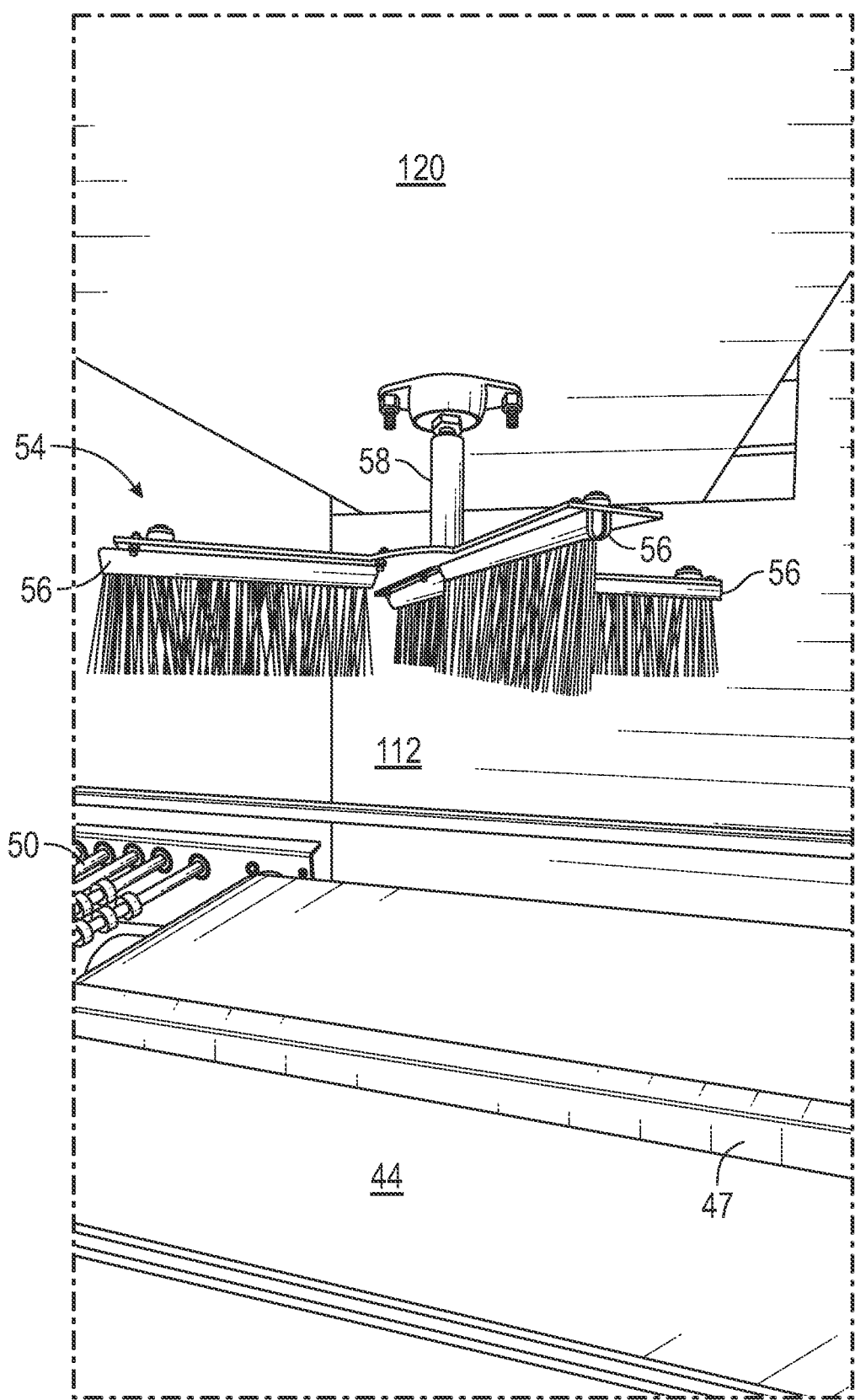
FIG. 12 is a partial perspective view of the rotating brush head for removing excess soil from pots shown in FIG. 11 in accordance with the present disclosure.

In a preferred embodiment, as best seen in FIGS. 11 and 12, the apparatus 10 further comprises a soil removal element 54 positioned over the belt 44 of the second conveyor 42 at a downstream position from the chute 36. The soil removal element 54 is positioned relative to the belt 44 so as to cause the soil removal element 54 to remove excess soil from an upper end of a soil-filled pot as the soil-filled pot is conveyed on the belt 44 under the soil removal element 54 in the second conveyance direction 46. The soil removal element 54 includes a horizontal component that is disposed in a generally horizontal position above and parallel to the upper surface of the belt 44. The height of the element 54 relative to the belt 44 may be adjusted for use with pots 88 of different sizes. Because loose soil is conveyed into pots 88 continuously by the first conveyor 22 and auger 38, there will typically be an overflow of loose soil onto the upper surface of the belt 44, as not all of the soil dropping downward through the chute 36 will land inside of a pot 88. In addition, each pot 88 is typically over-filled with soil to ensure that each pot 88 is adequately topped off with soil. The soil removal element 54 removes this excess soil so that each pot 88 is fully filled and the soil is generally leveled off at the upper open end of the pot 88. The horizontal component of the soil removal element 54 is positioned relative to the belt 44 to level off the soil at the upper open end of each pot 88.

In a preferred embodiment, the soil removal element 54 comprises a plurality of rotating brush heads 56 each extending radially outward from a vertically oriented axle 58. FIG. 12 illustrates a detailed view of the rotating brush head 56 assembly. The brush heads 56 are each generally horizontal and parallel to the upper surface of the belt 44 of the second conveyor 42 and have downwardly extending flexible bristles. The brush heads 56 are positioned over the conveyor belt 44 at a downstream position from the chute 36, and each pot 88 passes below the rotating brush heads 56. As the brush heads 56 rotate, they remove excess soil from an upper end of each soil-filled pot as the soil-filled pot is conveyed on the belt 44. The brush heads 56 may be positioned at a height relative to each pot 88 so that the flexible bristles brush across the upper open end of each pot 88 without the rigid horizontal support of the brush head 56 contacting the upper end of the pot 88, thereby brushing excess soil off of the upper open end of each pot 88 and onto the belt 44 without forcible contact by the rigid component of the brush head 56.

In a preferred embodiment, as best seen in FIG. 11, the vertically oriented axle 58 is slidably mounted onto a track, which preferably comprises two opposing linear track bars 114 that are mounted along the sides of the conveyor belt 44 and positioned parallel to the second conveyance direction 46. The track bars 114 allow the rotating brush head 56 assembly to be positioned in any location along the conveyor belt 44. As best seen in FIGS. 11 and 12, the vertical axle 58 may be mounted directly onto a horizontal plate 120 that is connected to two opposing pillow block mounts 122 each having an opening in which one respective track bar 114 is slidably disposed. Thus, the brush heads 56 are positionable on either of two opposing sides of the chute 36 and the plates 40 that extend downwardly from the chute opening 36 by sliding the brush head 56 assembly linearly along the track bars 114 to the desired position. This allows the brush heads 56 to be positioned downstream of the chute 36 regardless of which direction pots 88 are being conveyed on the conveyor belt 44. The chute downward extension plates 40 are removable so that the extension plates 40 do not obstruct movement of the brush head 56 assembly when repositioning the assembly on the opposite side of the chute 36. Once repositioned, the extension plates 40 may be reattached for normal operation. Rotation of the axle 58 may be driven by an electric motor 116 mounted onto plate 120 and a drive pulley 118 operably connecting the motor 116 to the axle 58, as best seen in FIG. 11.

Figure 9:
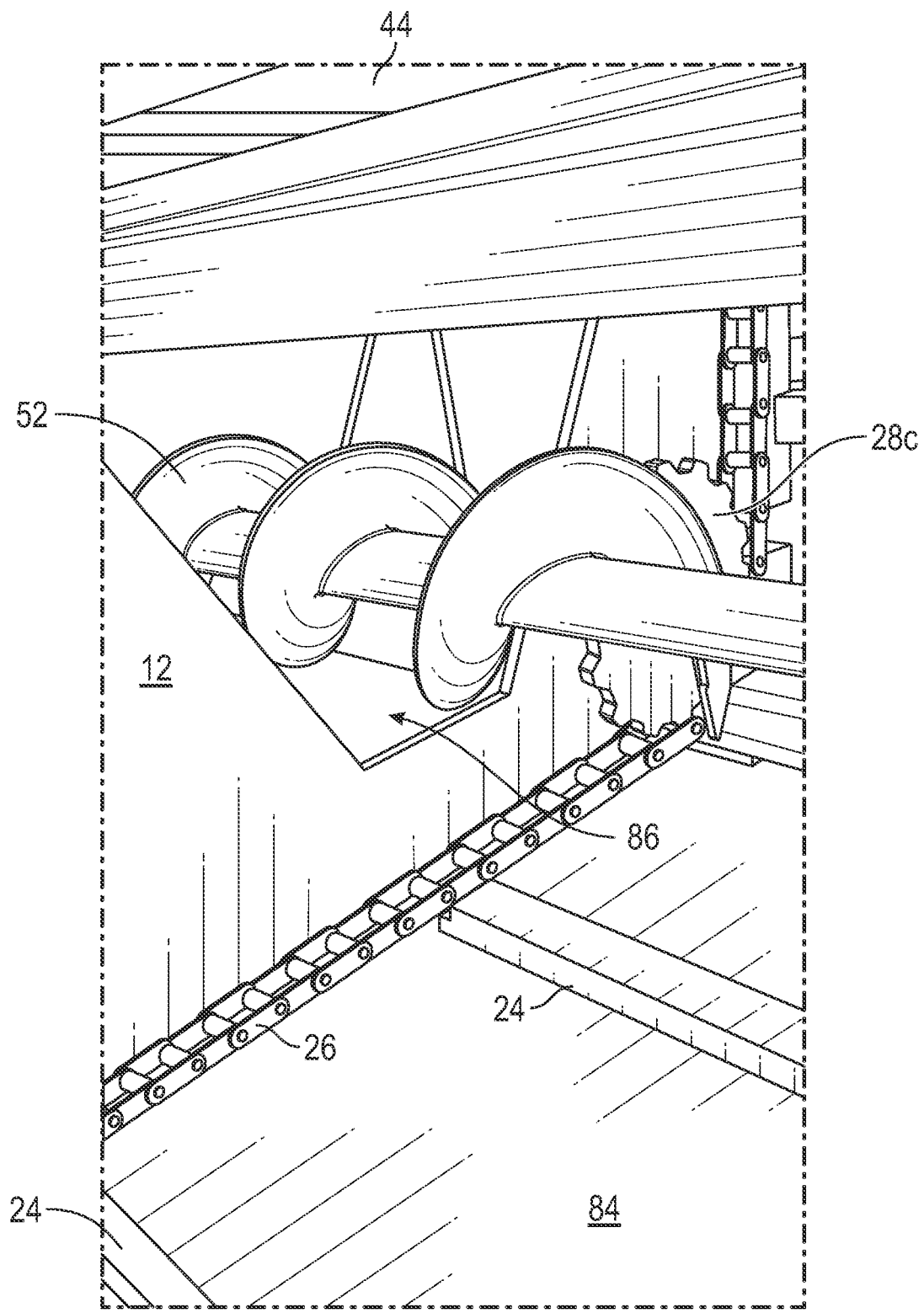
FIG. 9 is a partial perspective view of a second auger positioned below the conveyor belt shown in FIG. 6 in accordance with the present disclosure.

The apparatus preferably also includes a soil management system for recycling loose overflow soil back to the upstream end 72 of the bed 20 so that overflow soil is redistributed back to a pot 88 for filling. As soil falls down through the chute 36, the majority of the soil will be deposited into a pot 88, but some soil will fall onto the conveyor belt 44. In addition, some soil deposited into each pot 88 will be leveled off from the top of each pot 88 by the brush heads 56 and will also fall onto the conveyor belt 44. This overflow soil will then be conveyed to the end 48 of the conveyor belt 44 where the loose soil will drop off the end 48 and be recycled back to the upstream end 72 of the bed 20. The apparatus 10 includes a floor 84 disposed below the bed 20 and below the second conveyor 42, as best seen in FIGS. 1 and 9. The floor 84 extends between the two side walls 12 from the front wall 15 to the rear end of the apparatus 10 just below the upstream end 72 of the bed 20. The floor 84 comprises a generally flat and horizontal fixed surface. As best seen in FIG. 1, a plurality of sprockets 28 are configured to drive the drive chains 26 in a loop 70 from the upstream end 72 of the bed 20 to the downstream end 74 of the bed 20 and back to the upstream end 72. In a preferred embodiment, the apparatus 10 comprises three sets of sprockets 28. One set of sprockets 28a is positioned at the upstream end 72 of the bed 20, and a second set of sprockets 28b is positioned past the downstream end 74 of the bed 20 on the opposite side of both the trough 34 and the conveyor belt 44 from the downstream end 74 of the bed 20. Thus, the spaced bars 24 of the first conveyor 22 move along the bed 20 to convey soil from the upstream end 72 to the downstream end 74 of the bed 20 and then continue moving past the downstream end 74 to the second set 28b of sprockets, as best seen in FIGS. 1 and 7. When the soil being conveyed on the bed 20 reaches the downstream end 74 of the bed the soil drops down from the downstream end 74 of the bed 20 into the trough 34 below as the spaced bars 24 continue moving toward the second set 28b of sprockets. A third set 28c of sprockets is positioned below the second set 28b and in close proximity to the floor 84 of the apparatus 10, as best seen in FIG. 1. With this arrangement of sprockets 28, the loop 70 formed by the drive chains 26 may generally have three sections, which include a section that runs generally along the length of the inclined bed 20 in the first conveyance direction 25, a generally vertical section that drops the drive chains 26 down to a point near the floor 84, and a section that runs generally along the floor 84 from the third set of sprockets 28c to the upstream end 72 of the bed 20. Thus, a portion of the loop 70 is positioned relative to the floor 84 so as to cause the spaced bars 24 to move along the surface of the floor 84 with the spaced bars 24 abutting the surface of the floor 84, which thereby conveys any overflow soil that falls off of the conveyor belt 44 and down to the floor 84 back to the upstream end 72 of the bed 20 for recycling the soil back to a pot 88. Each set of sprockets 28a, 28b, and 28c, respectively, may be connected to each other by an axle 110 extending between the sprockets, as best seen in FIGS. 7 and 11. The ends of the axles 110 may be mounted on the side walls 12 on bearings 100, as shown in FIG. 4. As best seen in FIG. 3, a motor 90 may be used to drive one set of sprockets 28b in order to drive the entire drive chain loop 70. The motor 90 may be mounted on an exterior of a side wall 12 of the apparatus 10.

Figure 10:
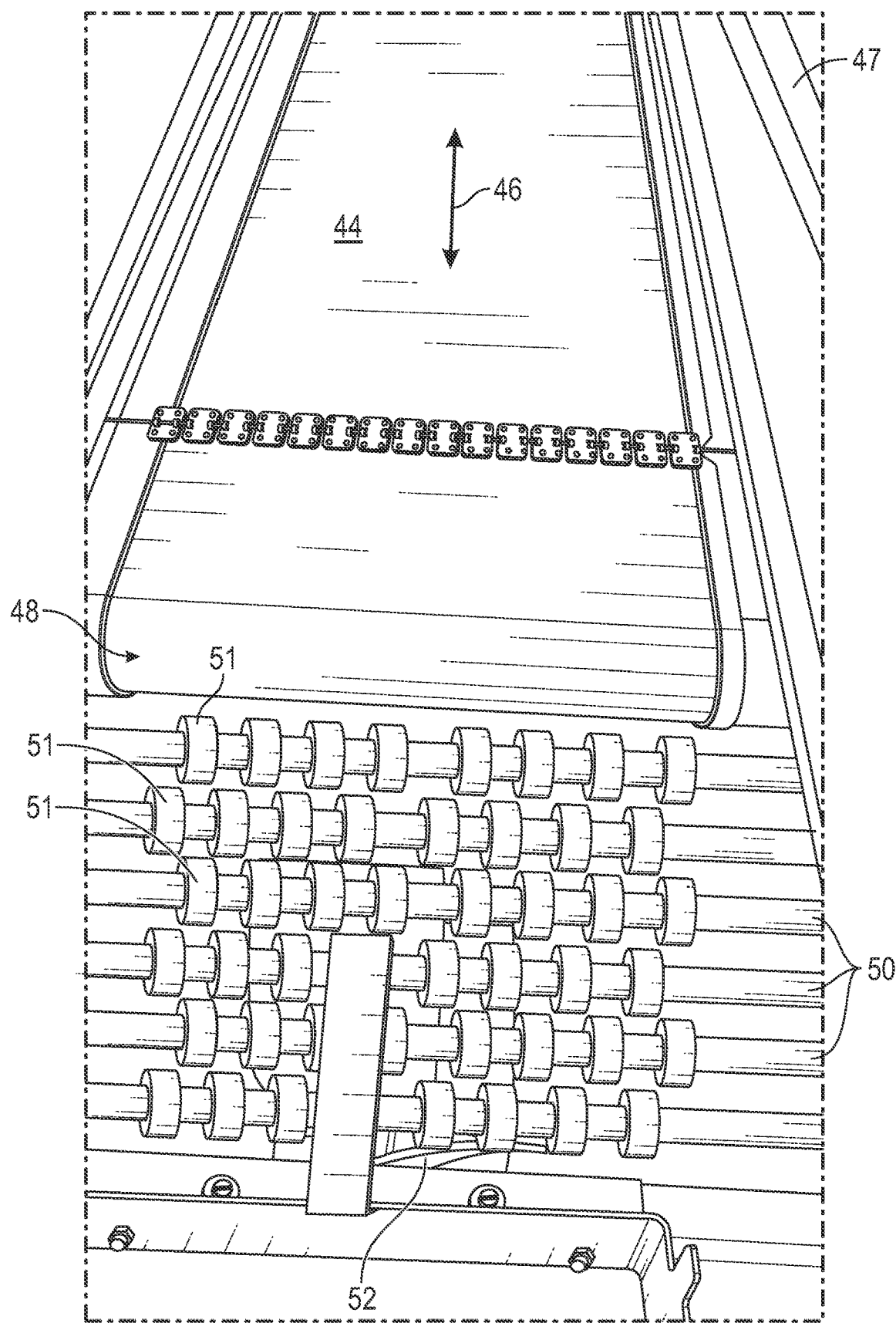
FIG. 10 is a partial top perspective view of an end of the conveyor belt shown in FIG. 6 in accordance with the present disclosure.

To facilitate soil recycling, in a preferred embodiment, the apparatus 10 includes a second auger 52 disposed below the conveyor belt 44, as best seen in FIGS. 1, 9, and 10. The second auger 52 is disposed in a position parallel to the second conveyance direction 46 and transverse to the first conveyance direction 25, and preferably perpendicular to the first conveyance direction 25. The second auger 52 has two opposing helical screw blades that are configured to convey overflow soil that falls off the ends 48 of the conveyor belt 44 toward a center of the auger 52, which conveys the soil onto the floor 84 where it is recycled back to the upstream end 72 of the bed 20. The apparatus 10 preferably includes two opposing extension sections 86 that extend outwardly from the side walls 12 of the apparatus 10. The extension sections 86 support the ends 48 of the conveyor belt 44 of the second conveyor 42 and provide operators of the apparatus 10 a convenient location on which to feed pots 88 onto the conveyor belt 44. The extension sections 86 preferably also support a set of bars 50 that freely rotate, which may each have a plurality of rollers 51 attached thereto. FIG. 10 shows a close-up view of one end 48 of the belt 44 and the bars 50 with the second auger 52 positioned below the end 48 of the belt 44. FIG. 9 shows a view from within the interior of the apparatus 10, which illustrates the second auger 52 positioned below the belt 44 and above the floor 84 of the apparatus 10. As shown in FIG. 9, the interior of each extension section 86 is hollow and thus functions as a portion of a trough for receiving overflow soil from the conveyor belt 44. The helical screw blades of the second auger 52 are positioned within the interior of each respective extension section 86. Thus, as the conveyor belt 44 conveys pots 88 that have been filled with soil, the pots 88 are conveyed off the end 48 of the belt 44 and onto the roller bars 50, at which point the soil-filled pots may be removed from the apparatus 10. The loose soil on the upper surface of the belt 44 then falls down through the roller bars 50 and into the interior of the extension sections 86, at which point the second auger 52 conveys the loose soil inward and onto the floor 84 of the apparatus 10. Once the soil is on the floor 84, the spaced bars 24 of the first conveyor 22 convey the loose soil from below the belt 44 and the second auger 52 to the rear end of the apparatus 10 below the upstream end 72 of the bed 20. The bars 24 are driven by the drive chains 26 and move along the fixed surface of the floor 84, thereby conveying the overflow soil along the surface of the floor 84. As best seen in FIG. 1, a portion of the floor 84 at the rear end of the apparatus 10 may be contoured upwardly to generally conform to the path of the bars 24 as the bars 24 move around the first set of sprockets 28a so that the bars 24 push the loose soil upward onto the upper surface of the bed 20 so that the soil may then be conveyed back to the downstream end 74 of the bed 20 to make another pass through the apparatus 10. As best seen in FIG. 3, the second auger 52 may be driven by a motor 96, which may be mounted on an exterior of one of the extension sections 86. As shown in FIG. 4, the opposing end of the auger 52 may be mounted onto the opposing extension section 86 on a bearing 104.

As shown in FIG. 3, the apparatus preferably includes a control box 80 that houses a control panel for operating each component of the apparatus 10. The control panel is operatively connected to each component of the apparatus 10 via electrical wiring or hydraulic hoses and is configured to control operation of each component. The control box 80 is preferably mounted on the exterior of one of the side walls 12 of the apparatus 10. The control panel may be used to control the hydraulic arms 64 of the lift 62 and may be used to control power to start and stop various components, including the motor 98 that operates the breaker bars 30, the motor 90 that drives the first conveyor 22, the motor 92 that drives the conveyor belt 44, the motor 94 that drives the first auger 38, the motor 96 that drives the second auger 52, and the motor 116 that drives rotation of the brush heads 56. The control panel may be used to adjust the speed of all motors during continuous operation to optimize performance of the apparatus 10. The control panel may also be used to program the conveyor belt 44 to pause briefly while a pot is directly under the chute 36 and being filled with soil during normal continuous operation of the apparatus 10.

The foregoing description of the specified embodiments will so fully reveal the general nature of the invention so that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments based on the teaching and guidance presented herein. It is to be understood that phraseology or terminology herein is for the purpose of description and not for limitation, such that the terminology or phraseology of the present specification is to be interpreted by the skilled artisan in light of the teachings and guidance.

What is claimed is:

1. A potting apparatus comprising:
    a bed and a first conveyor configured to move along the bed in a first conveyance direction from an upstream end of the bed to a downstream end of the bed;
    a pair of opposing rotating breaker bars positioned over the bed transverse to the first conveyance direction, wherein the breaker bars are configured to break apart blocks of soil as the blocks are conveyed along the bed in the first conveyance direction;
    an elongated trough disposed transverse to the first conveyance direction, wherein the trough is positioned downstream of the breaker bars and below the downstream end of the bed;
    an auger positioned within the trough and configured to convey loose soil into a chute; and
    a second conveyor positioned below the chute, wherein the second conveyor comprises a conveyor belt having an upper surface, wherein the conveyor belt is configured to convey a pot received on the upper surface in a second conveyance direction under the chute.

2. The apparatus of claim 1, wherein the apparatus is mounted on a portable trailer having wheels.

3. The apparatus of claim 1, wherein the second conveyance direction is transverse to the first conveyance direction, wherein the apparatus further comprises an enclosure comprising two opposing walls each positioned along one respective side of the bed and parallel to the first conveyance direction, wherein each wall has an opening, wherein the conveyor belt has two opposing ends, wherein each end is positioned adjacent to one respective opening in one of the walls.

4. The apparatus of claim 1, further comprising a lift comprising a platform operatively connected to a hydraulic arm, wherein an end of the platform is pivotally mounted on an axle positioned transverse to the first conveyance direction at the upstream end of the bed, wherein the hydraulic arm is configured to pivot the platform about an axis of rotation of the axle, wherein the lift further comprises a retaining element configured to retain a pallet on the platform.

5. The apparatus of claim 1, wherein the bed comprises a generally flat fixed surface, wherein the first conveyor comprises a plurality of bars in spaced relation and two opposing drive chains, wherein each of the spaced bars is in a position abutting the fixed surface of the bed and transverse to the first conveyance direction, wherein each of the spaced bars is attached at one end to one of the drive chains and at an opposite end to the opposing drive chain, wherein each drive chain is positioned along one respective side of the bed and parallel to the first conveyance direction, and wherein the drive chains are configured to move the spaced bars along the fixed surface of the bed in the first conveyance direction from the upstream end of the bed to the downstream end of the bed.

6. The apparatus of claim 5, wherein the apparatus includes a floor disposed below the bed and below the conveyor belt, wherein the floor comprises a generally flat fixed surface, wherein the apparatus further comprises a plurality of sprockets configured to drive the drive chains in a loop from the upstream end of the bed to the downstream end of the bed and back to the upstream end, wherein a portion of the loop is positioned relative to the floor so as to cause the spaced bars to move along the fixed surface of the floor toward the upstream end of the bed with the spaced bars abutting the surface of the floor.

7. The apparatus of claim 6, further comprising a second auger disposed below the conveyor belt in a position parallel to the second conveyance direction and transverse to the first conveyance direction, wherein the second auger has two opposing helical screw blades configured to convey overflow soil onto the floor.

8. The apparatus of claim 1, further comprising a soil removal element positioned over the conveyor belt of the second conveyor at a downstream position from the chute, wherein the soil removal element is positioned relative to the conveyor belt so as to cause the soil removal element to remove excess soil from an upper end of a soil-filled pot as the soil-filled pot is conveyed on the conveyor belt under the soil removal element in the second conveyance direction.

9. The apparatus of claim 8, wherein the soil removal element comprises a plurality of rotating brush heads each extending radially outward from a vertically oriented axle, wherein the brush heads are each parallel to the upper surface of the conveyor belt of the second conveyor.

10. The apparatus of claim 9, wherein the axle is slidably mounted onto a track that is parallel to the second conveyance direction such that the rotating brush heads are positionable on either of two opposing sides of the chute.

11. The apparatus of claim 1, wherein the bed comprises a generally flat surface inclined upwardly from the upstream end of the bed to the downstream end of the bed.

12. The apparatus of claim 1, wherein the second conveyance direction is transverse to the first conveyance direction, wherein the apparatus further comprises a second auger disposed below the conveyor belt in a position parallel to the second conveyance direction and transverse to the first conveyance direction, wherein the second auger has two opposing helical screw blades configured to convey overflow soil from opposing ends of the second auger toward a center of the second auger.

13. The apparatus of claim 1, wherein the breaker bars each have a cylindrical shape, and wherein the breaker bars each have a plurality of teeth disposed radially around an exterior surface of each respective bar.

14. A potting apparatus comprising:
a bed comprising a generally flat fixed surface;
a first conveyor comprising a plurality of bars in spaced relation and two opposing drive chains, wherein each of the spaced bars is attached at one end to one of the drive chains and at an opposite end to the opposing drive chain, wherein each drive chain is positioned along one respective side of the bed, wherein the drive chains are configured to move the spaced bars along the fixed surface of the bed in a first conveyance direction from an upstream end of the bed to a downstream end of the bed with the bars abutting the surface of the bed;
a pair of opposing rotating breaker bars positioned over the bed transverse to the first conveyance direction, wherein the breaker bars are configured to break apart blocks of soil as the blocks are conveyed along the bed in the first conveyance direction;
an elongated trough disposed transverse to the first conveyance direction, wherein the trough is positioned downstream of the breaker bars and below the downstream end of the bed;
an auger positioned within the trough and configured to convey loose soil into a chute defined by an opening at a low point of the trough;
a second conveyor positioned below the chute, wherein the second conveyor is configured to convey a pot under the chute in a second conveyance direction;
a floor disposed below the bed and below the second conveyor, wherein the floor comprises a generally flat fixed surface; and
a plurality of sprockets configured to drive the drive chains in a loop from the upstream end of the bed to the downstream end of the bed and back to the upstream end, wherein a portion of the loop is positioned relative to the floor so as to cause the spaced bars of the first conveyor to move along the fixed surface of the floor toward the upstream end of the bed with the bars abutting the surface of the floor.

15. The apparatus of claim 14, wherein the apparatus is mounted on a portable trailer having wheels.

16. The apparatus of claim 14, wherein the second conveyance direction is transverse to the first conveyance direction, wherein the apparatus further comprises an enclosure comprising two opposing walls each positioned along one respective side of the bed and parallel to the first conveyance direction, wherein each wall has an opening, wherein the second conveyor has two opposing ends, wherein each end is positioned adjacent to one respective opening in one of the walls.

17. The apparatus of claim 14, further comprising a lift comprising a platform operatively connected to a hydraulic arm, wherein an end of the platform is pivotally mounted on an axle positioned transverse to the first conveyance direction at the upstream end of the bed, wherein the hydraulic arm is configured to pivot the platform about an axis of rotation of the axle, wherein the lift further comprises a retaining element configured to retain a pallet on the platform.

18. The apparatus of claim 14, further comprising a second auger disposed below the second conveyor in a position parallel to the second conveyance direction and transverse to the first conveyance direction, wherein the second auger has two opposing helical screw blades configured to convey overflow soil onto the floor.

19. The apparatus of claim 14, further comprising a plurality of rotating brush heads positioned over the second conveyor at a downstream position from the chute, wherein each brush head extends radially outward from a vertically oriented axle, wherein the rotating brush heads are positioned relative to the second conveyor so as to cause the rotating brush heads to remove excess soil from an upper end of a soil-filled pot as the soil-filled pot is conveyed on the second conveyor in the second conveyance direction under the brush heads.

20. The apparatus of claim 19, wherein the axle is slidably mounted onto a track that is parallel to the second conveyance direction such that the rotating brush heads are positionable on either of two opposing sides of the chute.

21. The apparatus of claim 14, wherein the second conveyor comprises a conveyor belt having a generally flat upper surface, wherein the conveyor belt is configured to convey a pot received on the upper surface.

* * * * *